Figure 1:
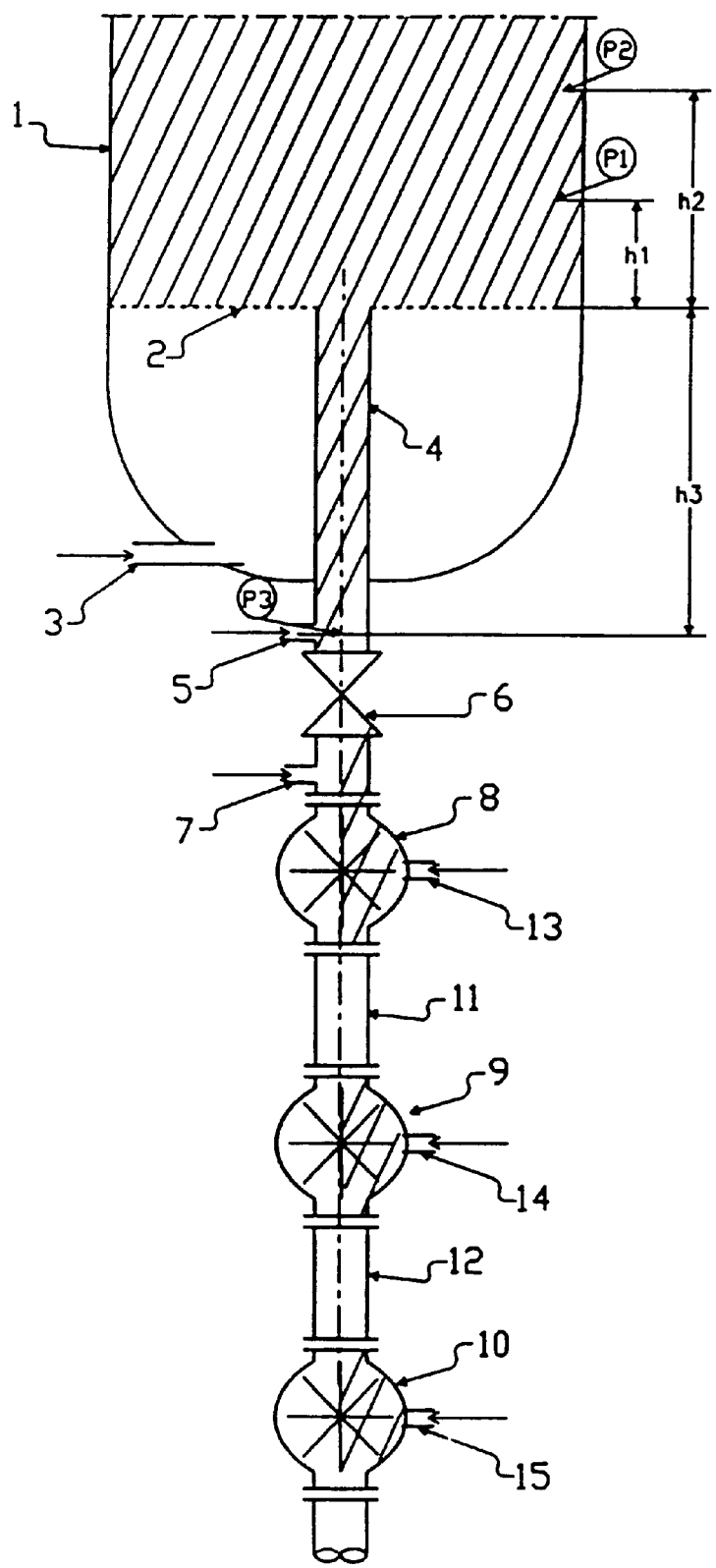

United States Patent
Ruelle et al.

[11] Patent Number: 6,135,317
[45] Date of Patent: Oct. 24, 2000

[54] DEVICE FOR UNLOADING A PRESSURIZED VESSEL

[75] Inventors: Jean-Jacques Ruelle, St-Remy-Geest; Roger Liegeois, Liège, both of Belgium

[73] Assignee: Solvay Polyolefins Europe-Belgium, Brussels, Belgium

[21] Appl. No.: 09/136,415

[22] Filed: Aug. 19, 1998

[30] Foreign Application Priority Data

Aug. 20, 1997 [BE] Belgium ............................... 09700693

[51] Int. Cl.$^7$ ...................................................... B67B 7/00
[52] U.S. Cl. ............................ 222/1; 222/195; 222/254; 222/368; 222/630
[58] Field of Search ............................. 222/1, 195, 254, 222/252, 368, 630, 636, 637

[56] References Cited

U.S. PATENT DOCUMENTS

| | | |
|---|---|---|
| 3,710,808 | 1/1973 | Celada et al. . |
| 4,247,240 | 1/1981 | Schora, Jr. et al. . |
| 4,495,337 | 1/1985 | Raufast . |
| 4,703,094 | 10/1987 | Raufast . |
| 4,784,298 | 11/1988 | Heep et al. . |
| 5,195,654 | 3/1993 | Takakarhu et al. .................. 222/636 X |
| 5,244,019 | 9/1993 | Derby .................................. 222/368 X |
| 5,265,983 | 11/1993 | Wennerstrom et al. . |

FOREIGN PATENT DOCUMENTS

| | | |
|---|---|---|
| 88655 | 2/1982 | European Pat. Off. . |
| 0088655B1 | 9/1983 | European Pat. Off. . |
| 0071430B1 | 3/1986 | European Pat. Off. . |
| 202076A1 | 11/1986 | European Pat. Off. . |
| 0250169A2 | 12/1987 | European Pat. Off. . |
| 2312287 | 12/1976 | France . |
| 2467628 | 4/1981 | France . |
| 139527 | 1/1980 | Germany . |
| 1375741 | 11/1974 | United Kingdom . |
| 2271114 | 4/1994 | United Kingdom . |

OTHER PUBLICATIONS

"Rotary Valves" by G.T. Todhunter from Particulate Matter Journal, Mar. 1973, pp. 73–81.

Modern Rotary Valve Technology fro Various Pneumatic Conveying Systems by H. Hoppe et al. Bulk Solids Handling, vol. 5, No. 4, Aug. 1985, pp. 161–165.

"The Role of High–Pressure Airblocks" by A.Ruf, PH.D.G. et al. TIZ Int'l Powder & Bulk Magazine, vol. 115, No. 1–2, 1991, pp. 33–36.

Primary Examiner—Kevin Shaver
Assistant Examiner—Thach Bui
Attorney, Agent, or Firm—Venable

[57] ABSTRACT

Device for unloading a pressurized vessel, comprising at least two rotary feeders in series, a valve situated between the reactor and the first feeder, and a point of entry for a gas, that is situated between the valve and the reactor.

20 Claims, 3 Drawing Sheets

DEVICE FOR UNLOADING A PRESSURIZED VESSEL

The invention relates to a device for unloading a powder from a pressurized vessel. It relates in particular to a device for unloading a polymer powder from a pressurized vessel and more specifically to a device for unloading a polymer powder from a fluidized-bed polymerization reactor.

It is known that the polymerization of alpha-olefins using highly reactive catalysts is often performed in the gas phase in fluidized-bed reactors working at high pressure, generally at a pressure of between 20 and 40 bar.

These gas-phase processes employ at least one fluidized-bed reactor comprising, in general, a very tall cylindrical shell equipped with:

a gas distributor (grid), one or more points of entry for catalyst, co-catalyst, prepolymer or first block of polymer (dual-mode configuration), one or more points for unloading the solid, through the side wall of the reactor and/or through the distributor.

The flow of gas which passes through the distributor acts simultaneously as:

fluidizing agent: it keeps the growing polymer particles in the state of a relatively dense fluidized layer, reagent: it contains the monomer(s) mixed with one or more inert gases, heat-transfer fluid: it heats up as it comes into contact with the particles and carries the heat given off by the reaction to one or more external exchangers before being recycled into the reactor (circulating gas).

Bearing in mind the high pressure in gas-phase polymerization, the conventional systems of unloading solids generally comprise at least one intermediate reservoir connected to the reactor and to a holding reservoir by means of pipes each of which is equipped with a valve. These valves operate in sequence so that the unloading system operates like a lock. Some of the polymer formed and some of the gas contained in the reactor passes first of all into the intermediate reservoir and then into the holding reservoir. Correct operation of the intermediate reservoir generally requires the use of a pressure-equalizing system placing the intermediate reservoir in communication with the top of the reactor. An unloading system of this kind is described in GB Patent 1375741.

Various versions of or variations on the lock principle are described or mentioned in European Patent Applications EP 0,071,430, EP 0,088,655 and EP 0,202,076.

European Patent Application EP 0,250,169 describes a system comprising two rotary valves which are driven in such a way that they are never both open simultaneously.

All these unloading systems operate discontinuously and require the use of valves which open in sequence. This discontinuous method of operation is often the cause of fluctuations in pressure and/or flow rate or of fluctuations in the level of the fluidized bed inside the reactor. The disruptions caused by the fluctuations in flow rate have a negative effect on the operation of the sectors downstream of the polymerization process.

These unloading systems often comprise a great many fast-opening valves through which the solid passes. These valves are exposed to problems of erosion and of sealing and therefore require costly maintenance.

Rotary feeders have been known for some time already and have already been described in detail, for example, in "Particulate Matter", March 1973, p. 73–81; in "Bulk Solids Handling", Vol. 5, N°. 4, August 1985; and in U.S. Pat. No. 4,784,298. They consist of a body (stator) in which there rotates a wheel (rotor) which has a certain number of cavities separated from one another by vanes. The solid flows under gravity into the cavities which lie in the top of the feeder and is transported to the lower part during the rotation. The clearance between the vanes of the rotor and the stator needs to be minimized in order to reduce gas leaks.

The rotary feeder is the item most often used as a feed device in pneumatic conveying at pressure. In this application, the feeder is used to convey a pulverulent solid from a low pressure, typically atmospheric pressure, to a higher pressure, generally limited to a few bar. In such cases, a counterflow of gas is produced and this is liable to disturb the filling of the cavities by the solid if the feeder is not properly sealed, or if it is not equipped with a system for evacuating the counterflow of gas (Ruf (A.) et al., "The role of high-pressure airblocks", TIZ international Powder & Bulk Magazine, Vol. 115, N° 1–2, 1991 and Hoppe (H.) et al., in "Modern rotary valve technology for various pneumatic conveying systems", Bulk Solids Handling, Volume 5, Number 4, August 1985).

Applications of rotary feeders to pneumatic conveying by suction are also known. In this case, a co-current of solid and of gas is observed, these two currents, however, being at differential pressures limited to the order of 1 bar (cf. Ruf (A.) above).

The application of rotary feeders to the unloading of a reactor of the fluidized-bed type is also known. German Democratic Repulic Patent 139527, for example, describes a device for loading and unloading a reactor of the fluidized-bed type for granulating pulverulent materials, comprising a single rotary feeder. However, in this application, the pressure differences are very low, and far below those encountered in present-day polymerization reactors.

The present invention aims to provide a device for unloading a powder from a pressurized vessel comprising such feeders and allowing the vessel to be unloaded continuously. The device according to the invention is preferably applied to the unloading of a polymer powder from a pressurized vessel and more particularly to the unloading of a polymer powder from a fluidized-bed polymerization reactor.

To this end, the invention relates to a device for unloading a pressurized vessel, characterized in that it comprises: at least two rotary feeders in series, a valve situated between the reactor and the first feeder, and a point of entry for a gas, that is situated between the said valve and the said vessel.

Within the present invention, the term "pressurized vessel" should be understood as meaning a vessel containing a gas at a pressure of at least 10 bar, preferably at least 15 bar and more specifically at least 20 bar.

Within the present invention, the term "powder" should be understood as meaning any divided solid. As a preference, the dimensions of the particles of solid are below 15 mm, more specifically below 10 mm.

One of the advantages of the device according to the invention is that it allows continuous unloading of the vessel without disturbing the pressure within the said vessel. The products leaving the vessel can be fed continuously to the installations situated downstream of the vessel, without disrupting them. Such an advantage is particularly beneficial when unloading polymerization reactors, in which any disruption is liable to cause changes to the polymerization reaction.

A second advantage is that the unloading device contains no parts that are moving discontinuously, and this reduces wear and thus maintenance and servicing costs.

An estimate of the flow rate of solid removed by this unloading device is given by the product of the factors (rotational speed)×(total volume of cavities)×(mass per unit volume of the bulk solid)×(cavity fill coefficient). In an unloading device where there is a strong co-current of gas and of solid, it has been found experimentally that the fill coefficient could be taken as being equal to 1. In the case of the unloading of a fluidized-bed polymerization reactor, the rate of unloading of the polymer formed may therefore be adapted to the amount of substance produced by increasing or decreasing the rotational speed of the feeders, thus making it possible to keep the level of the fluidized bed constant throughout the operation.

The unloading device may also be adapted to the type of polymer produced, by altering the geometry of the rotor, for example by changing the shape of the cavities of the rotary feeders.

As the rate at which the gases are drawn off from the vessel is uniform throughout the unloading process, this unloading device makes it possible to avoid the phenomena of hammering in the pipework, which is caused by the opening and closing of the valves.

The rate at which the gases are drawn off from the vessel may be modified by action on the leakage rate of the rotary feeders, for example by changing the geometry of the rotary feeder or alternatively by introducing a gas through the point of entry that is situated between the valve and the vessel.

The leakage flow rate through each rotary feeder depends on a number of factors, the main ones of which are: the total number of leaktight cavities, the length of the rotor and the clearance between the rotor and the stator. It has been observed that the leakage flow rate through each feeder is approximately proportional to the difference in pressure between the inlet and the outlet.

The valve situated between the reactor and the first feeder allows the vessel to be isolated before it is unloaded.

In the case of a device for unloading a fluidized-bed polymerization reactor, it in particular allows the reactor to be isolated during the polymerization start-up operations.

Before unloading, a gas, preferably containing the gas present in the vessel, is injected through the point of entry that is situated upstream of the valve. The flow rate of injected gas makes it possible to prevent particles of powder being deposited in the discharge pipe and plugging it before the start of the operation of unloading the vessel. Injecting this gas during the unloading of the reactor makes it possible to avoid settling of particles in the discharge pipe upstream of the feeders. The flow rate of this gas is preferably regulated in such a way that the speed of the gas inside the pipes is between 1 and 10 times the fluidization speed for the particles.

In the case of the unloading of a fluidized-bed polymerization reactor, the said gas is preferably the monomer which will be consumed in the reactor.

According to a first advantageous embodiment, the unloading device also comprises a point of entry for a gas, that is situated between the said valve and the first feeder.

By injecting a gas through the point of entry that is situated between the valve and the first feeder, it is possible to pressurize the rotary feeders before the start of the operation of unloading the vessel, i.e. before opening the valve situated upstream of the first rotary feeder. This makes the start of the unloading operations easier and makes it possible to minimize the disruptions in the vessel that are due to the pressure drop when the valve situated between the vessel and the first rotary feeder is opened. In practice, this pressurizing of the rotary feeders makes it possible to minimize the mechanical stress on the feeders when the valve is opened at the beginning of unloading.

During the unloading of the vessel it is possible—thanks to this point of entry—to inject a flow rate of sealing gas. The flow rate of this sealing gas introduced upstream of the rotary feeder is regulated in such a way as to be higher than the leakage flow rate of the feeder and as to create a slight upwards flow with respect to the walls of the discharge pipe, upstream of the point of entry.

The upwards flow of sealing gas prevents the settling of the particles of polymer above the point of entry.

Advantageously, the upwards speed of sealing gas is regulated in such a way that the differential speed between the gas and the solid is between 0 and 10 times the minimum fluidization speed. It is also possible to regulate the flow rate of solid discharged by regulating the upwards speed of the gases to a value that is between the minimum fluidization speed and the terminal free-fall speed of the particles. Advantageously, the upwards speed of the gas is equal to the minimum fluidization speed of the solid under the temperature and pressure conditions of the vessel.

When the vessel is a fluidized-bed vessel such as, by way of non-limiting example, a fluidized-bed polymerization reactor, the flow rate of the sealing gas is preferably regulated using three pressure measurements—P1 in the fluidized bed at a height h1 above and close to the gas distributor, P2 in the fluidized bed, at a height h2>h1 and P3 at the point of entry of the sealing gas at a height h3 below the gas distributor. These measurements are usually such that $(P3-P1) \geq (P1-P2) \times (h3+h1)/(h2-h1)$.

In the case of a fluidized-bed polymerization reactor, the sealing gas may be drawn from the circulating gas or have some other composition. It will advantageously consist of one or more gases which are inert as far as polymerization is concerned, and will preferably be cold, this being so as to prevent or inhibit polymerization as soon as the solid enters the discharge pipe.

As a preference, the unloading device comprises a point of entry for a gas, that is situated upstream of at least one rotary feeder.

The distance between this point of entry for a gas and the said rotary feeder must be small and preferably must not exceed 0.3 m.

It will be noted that at the start of unloading, it is advantageous for gas to be injected both via the point of entry that is situated between the valve and the feeder and via the point of entry that is situated between the vessel and the valve. During unloading, the introduction of gas via the point that is situated between the valve and the feeder usually proves sufficient.

Advantageously, the unloading device also comprises a point of entry for a gas, that is situated downstream of at least one rotary feeder.

It is also possible to inject a sealing gas via this point. It is also possible to draw off gas so as to equalize the pressures between the feeders and/or so as to reduce the leakage flow rate in the feeders. It is also possible to recover gases via this point.

In general, these points of entry for a gas upstream and/or downstream of the feeders make it possible to inject a flow rate of gas which prevents the solid particles from settling in the feeders and respectively in the pipes between the feeders and downstream of the feeders.

In the conditions for unloading an olefinpolymerization reactor, the quality of the flow of polymer through the pipework separating the point of unloading in the reactor from the inlet for solid into the first feeder, and in the pipework separating the rotary feeders from each other, plays an important part in the performance of the system as a whole. This is because when the polymer flows downwards in the same direction as the gas and the gas has a speed that is higher than that of the solid, the latter is compacted in the pipework to such an extent that curing and blockages occur. This phenomenon occurs when the solid is sticky, compressible and the height of solid in the state of fixed or mobile bed compacted in the pipework exceeds about 0.3 m.

According to a preferred embodiment of the present invention, the speed at which the feeders rotate is regulated so that it increases in the direction downstream of the vessel. This makes it possible to avoid a build-up of solid between the feeders.

A surprising aspect of the present invention lies in the fact that the pressure drops between the various feeders are not uniform.

Typically, for unloading a vessel at a pressure between 25 and 35 bar, the pressure drop is distributed as follows, through an unloading device that comprises three rotary feeders in series:

15 to 30% in the first feeder, typically 20%,
25 to 35% in the second feeder, typically 30%,
55 to 45% in the third feeder, typically 50%.

The differences in pressure drops between the feeders are all the greater, the greater the difference in density of the gas between the inlet and the outlet of the unloading device, something which occurs when the pressure drop is high and when the gas compressibility factor depends greatly on the pressure.

Contrary to what could be expected, it is the last rotary feeder situated furthest downstream from the reactor which is the most highly stressed, rather than the first feeder close to the vessel. The minimum total number of feeders that should be installed will depend on the maximum pressure difference that the last rotary feeder can mechanically withstand. This maximum value is estimated to be about 10 to 15 bar, using current technology.

According to another aspect of the present invention, there is also proposed a method for unloading a powder from a vessel, using an unloading device described above, the method according to the invention preferably being applied to the unloading of a polymer powder from a vessel, and more particularly a fluidized-bed polymerization reactor.

According to a first advantageous embodiment of the unloading method, a flow rate of sealing gas is introduced upstream of the said first rotary feeder, creating an upwards flow towards the vessel.

The speed of the upwards flow of sealing gas is regulated in such a way that the differential speed between the gas and the solid is between 0 and 10 times the minimum fluidization speed, and preferably in such a way that the differential speed between the gas and the solid is equal to the minimum fluidization speed of the solid under the temperature and pressure conditions of the vessel.

The rotary feeders may be pressurized before the start of unloading of the vessel, by injecting a gas through a point of entry that is situated between the valve and the said first rotary feeder. This pressurizing of the rotary feeders before the start of the unloading operation makes the start of the unloading operation easier by limiting the head loss when the valve situated between the reactor and the first rotary feeder is opened.

The rate at which the reactor is unloaded is regulated by altering the speed at which the rotary feeders rotate. The rate at which the gas is drawn off from the vessel is modified by injecting a gas through the point of entry that is situated between the valve and the reactor.

According to yet another aspect of the present invention, there is also proposed a fluidized-bed polymerization reactor comprising a vessel equipped with:
  a fluidizing-gas distributor,
  one or more points of entry for catalyst, co-catalyst, monomer, prepolymer or first block of polymer,
  one or more points for unloading the solid, comprising an unloading device described above.

The unloading device may be connected to the fluidizing-gas distributor, which preferably comprises a fluidizing grid which may be conical or frustoconical. In this case, the unloading device is preferably connected to the lowermost point of the fluidizing grid.

Alternatively, the unloading device may be connected to a solid-unloading point situated above the fluidizing grid, in a side wall of the vessel of the polymerization reactor.

Figure 2:
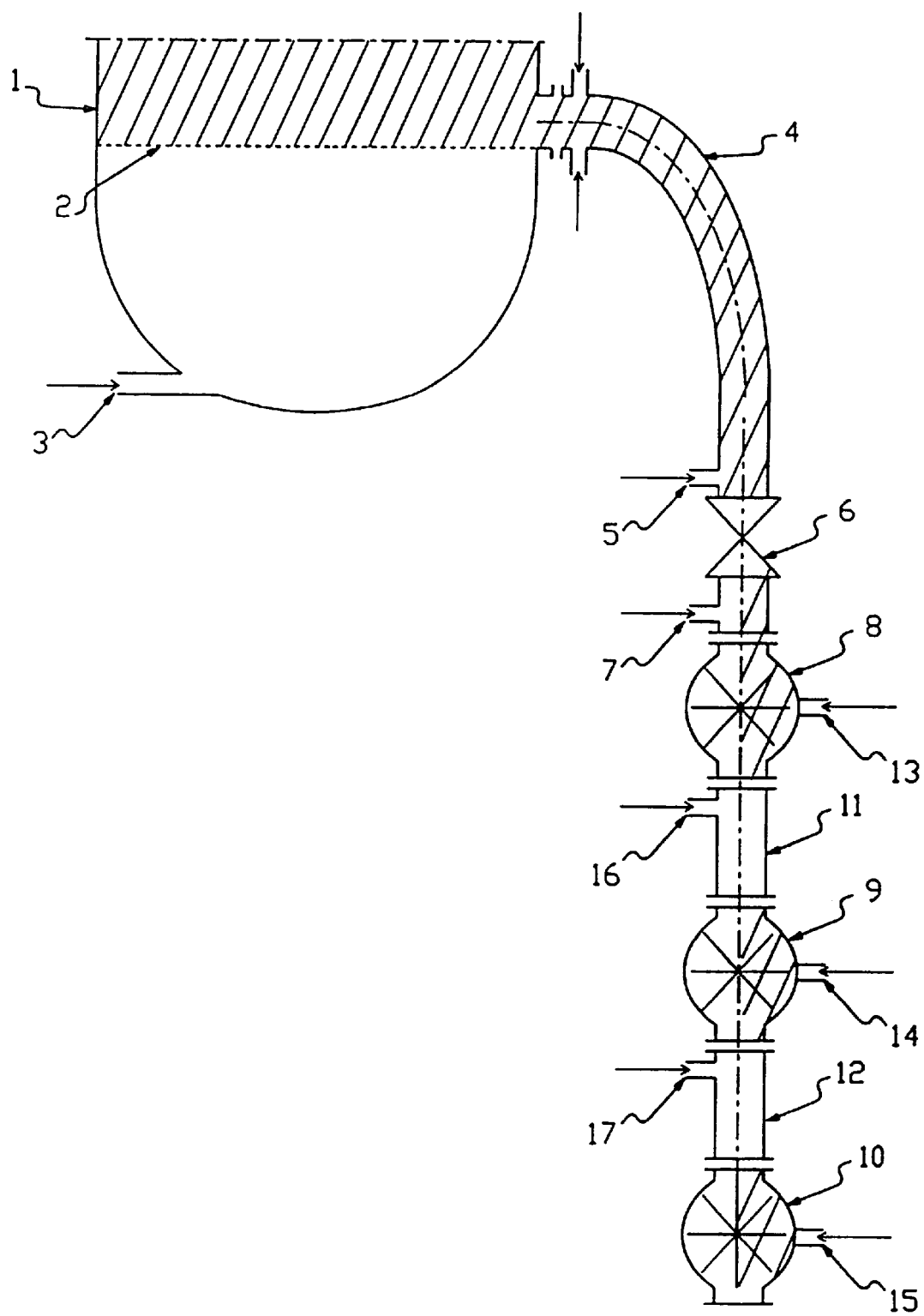
Figure 3:
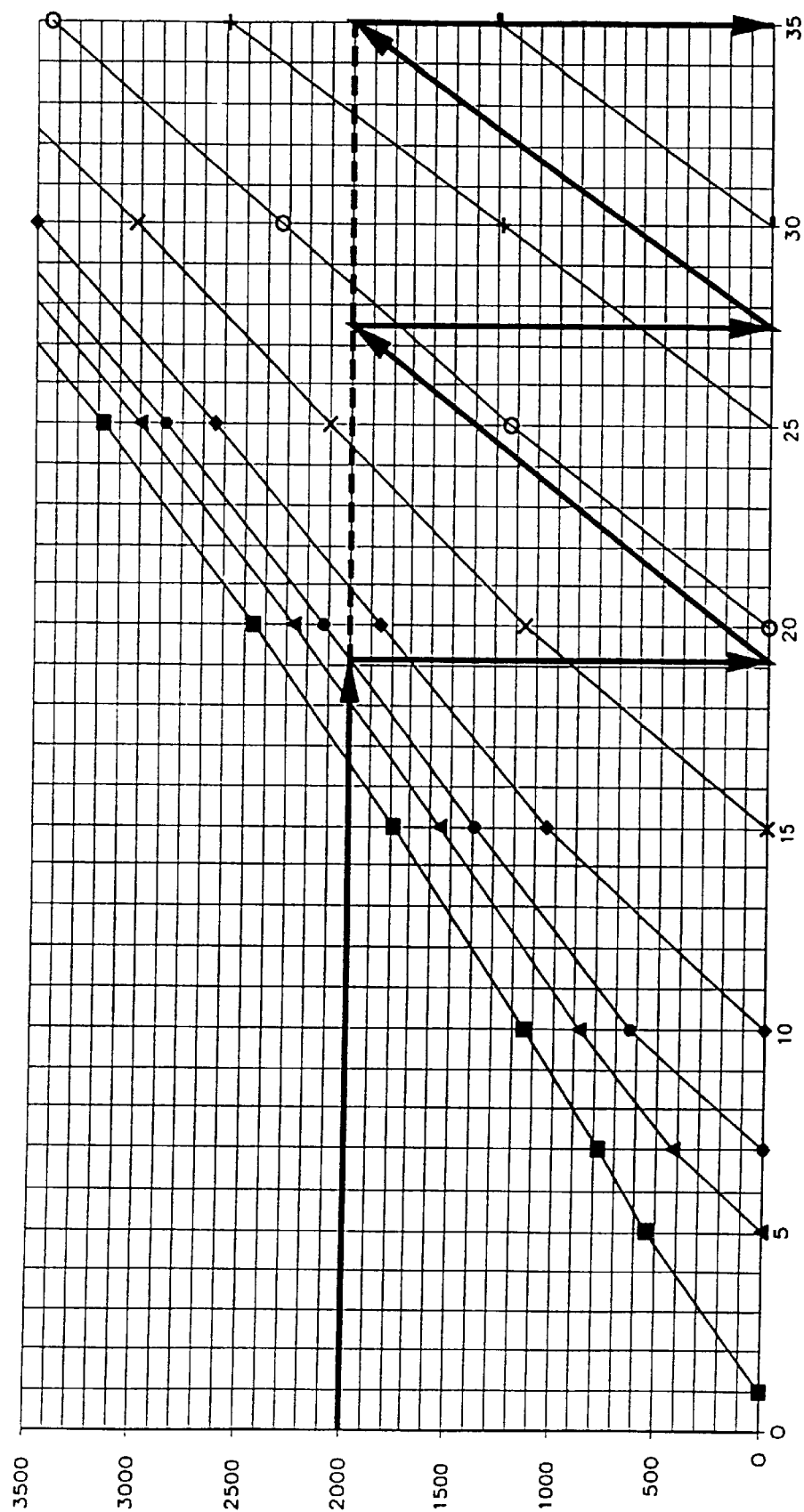

Other features of the invention, which apply more specifically to the unloading of a fluidized-bed polymerization reactor, are described, with no implied limitation, in the examples with reference to the figures, in which:

FIG. 1 diagrammatically depicts a fluidized-bed polymerization reactor comprising an unloading device making it possible to unload the reactor from the bottom, FIG. 2 diagrammatically shows a fluidized-bed polymerization reactor comprising an unloading device installed in the side wall of the reactor, and FIG. 3 shows the characteristic curves for the feeders: gas leakage rate (on the ordinate axis) as a function of inlet pressure (on the abscissa axis) for various outlet pressures.

FIG. 1 shows a fluidized-bed polymerization reactor 1 comprising a fluidizing-gas distributor 2 in the form of a grid. The fluidizing gas is injected by an injection line 3 situated in the lower part of the reactor 1 below the gas distributor 2. This gas passes through the gas distributor 2 and keeps the growing polymer particles contained in the reactor in suspension, thus forming the fluidized bed. This gas contains the monomers mixed with one or more inert gases, and heats up as it comes into contacts with the particles and carries the heat given off by the reaction to external exchangers before being recycled into the reactor 1.

The solid product is removed by a discharge pipe 4 passing through the bottom of the reactor 1 and opening into the gas distributor 2. This discharge pipe 4 comprises a first point of entry 5 for a gas, outside the reactor and upstream of a valve 6.

Downstream of the valve 6 and upstream of the first rotary feeder, there is a second point of entry 7 for a gas. This point of entry 7 may be of the same kind as the point of entry 5 situated upstream of the valve 6, or of a different kind.

The flow rate of sealing gas may be injected upstream of the first feeder, via the point of entry 5 between the valve and the reactor, or via the point of entry 7 between the valve and the first rotary feeder, or alternatively via both points of entry 5 and 7 simultaneously so as to create a slight upwards flow of gas in the discharge pipe, preventing the compacting of the polymer particles. The differential speed between the sealing gas and the solid is between 0 and 10 times the minimum fluidization speed for the solid under the temperature and pressure conditions of the reactor. The flow rate of sealing gas is preferably regulated using the pressure $P1$ measured in the fluidized bed at a height hi above the gas distributor 2, the pressure $P2$ measured in the fluidized bed at a height $h2>h1$ and the measurement of the pressure $P3$ at the point of entry of the sealing gas at a height $h3$ below the gas distributor 2 such that $(P3-P1) \geqq (P1-P2) \times (h3+h1)/(h2-h1)$.

Downstream of the valve 6, three rotary feeders 8, 9, 10 mounted in series remove the product formed from the reactor. The three feeders 8, 9, 10 are separated from one another by a pipe 11, 12. These pipes between the feeders are of a length which does not exceed about 0.3 m.

Each of the feeders is equipped with a point of entry 13, 14 and 15, allowing a flow rate of gas to be injected into each feeder. These injection points 13, 14, 15 are conventional devices allowing the mechanical packing and the wall of the rotary feeder to be sealed.

FIG. 2 shows the same reactor as in FIG. 1, except that the unloading device is not connected via the bottom of the reactor, but via an opening made in the side wall above the fluidizing-gas distributor. This device further comprises points of entry 16, 17 for a gas that is situated between the first and the second rotary feeders 8, 9, and between the second and third rotary feeders 9, 10, respectively.

FIG. 3 shows the characteristic curves of the feeders: gas leakage flow rate on the ordinate axis (in kg/h) as a function of inlet pressure on the abscissa (in bar) for various outlet pressures (in bar).

Key to output pressures:

1 bar: ■

5 bar: ▲

7 bar: ●

10 bar: ♦

15 bar: X 20 bar: ○

25 bar: +

30 bar: –

This graph shows that it is possible to reduce the gas leakage flow rate substantially by placing several rotary feeders in series. This is because, for a polymerization reactor operating at 35 bar, unloaded to a pressure of 7 bar, the leakage rate of the system is 2000 kg/h with intermediate pressures of 27.6 bar and 19.1 bar. The leakage rate is therefore reduced to 2 t/h.

The leakage rate would have been far higher if just one rotary feeder had been used.

EXAMPLE 1

Consider a gas-phase propylene polymerization reactor 3.2 m in diameter and of a height (of the cylindrical part) of 12 m, producing 20 t/h of polypropylene. Polymerization takes place at a pressure of 35 bar at a temperature of 80° C. The polymer produced has a bulk density of 450 kg/m$^3$. The polymer particles have a density of 900 kg/m$^3$ and a mean diameter of 650 microns. The average molecular weight of the gas mixture in the reactor is 39.8 kg/kmol.

The reactor is equipped with an unloading system comprising vertical pipework of a diameter of 0.3 m and a height of 4 m, the top of which lies level with the fluidizing grid, and the bottom of which is outside and just below the reactor.

This pipework is internally fitted, in turn, from top to bottom, with a gas-injection device, a shut-off valve of the ball valve type, and a second gas-injection device, the said pipework being connected at its base to a series of 3 feeders separated from one another by vertical lengths of pipework 0.5 m long.

The feeders have the following dimensions:

rotor length: 290 mm rotor diameter: 630 mm rotor volume: 50 dm$^3$ number of cavities: 30 (20 of which are sealed)

vane thickness: 10 mm rotor speed: 15 rpm.

For a polymerization reactor working at 35 bar and producing 20 t/h of polymer unloaded to a pressure of 7 bar, the leakage rate of the system is 2000 kg/h and the intermediate pressures 27.6 bar and 19.1 bar for an outlet pressure of 7 bar. The leakage rate is therefore reduced to 2 t/h, i.e. to 10% of the flow rate of the solid.

What is claimed is:

1. A device for unloading a powder from a pressurized vessel, the said device comprising:

at least two rotary feeders in series, a valve situated between the presurized vessel and the first feeder, and a point of entry for a gas, that is situated between the said valve and the said presurized vessel.

2. The device according to claim 1, applied to the unloading of a polymer powder.

3. The device according to claim 2, applied to the unloading of a polymer powder from a fluidized-bed polymerization reactor.

4. The unloading device according to claim 1, said device comprising further a point of entry for a gas, that is situated between the valve and the first feeder.

5. The unloading device according to claim 1, said device comprising a point of entry for a gas, that is situated upstream of at least one rotary feeder.

6. The unloading device according to claim 1, said device comprising a point of entry for a gas, that is situated downstream of at least one rotary feeder.

7. The unloading device according to claim 1, wherein the speed at which the feeders rotate is regulated so that it increases in the direction downstream of the vessel.

8. A method of unloading a powder from a pressurized vessel by means of a device comprising at least two rotary feeders in series, a valve situated between said pressurized vessel and the first rotary feeder, and a point of entry of a gas situated between said valve said pressurized vessel, and unloading the powder by opening said valve and operating said rotary feeders.

9. The unloading method according to claim 8, wherein a flow of sealing gas is introduced upstream of the said first rotary feeder, creating an upwards flow towards the vessel.

10. The unloading method according to claim 9, wherein the speed of the upwards flow of sealing gas is regulated in such a way that the differential speed between the gas and the solid is between 0 and 10 times the minimum fluidization speed.

11. The unloading method according to claim 10, wherein the speed of the upwards flow of sealing gas is regulated in such a way that the differential speed between the gas and the solid is equal to the minimum fluidization speed of the solid under the temperature and pressure conditions of the vessel.

12. The unloading method according to claim 8, wherein the rotary feeders are pressurized before the start of unloading of the vessel, by injecting a gas through a point of entry that is situated between the valve and the said first rotary feeder.

13. The unloading method according to claim 8, wherein the flow rate at which the vessel is unloaded is regulated by altering the speed at which the rotary feeders rotate.

14. The unloading method according to claim 8, wherein the flow rate at which the gas is drawn off from the vessel is modified by injecting a gas through the point of entry that is situated between the valve and the vessel.

15. A fluidized-bed polymerization reactor comprising a vessel equipped with:

a fluidizing-gas distributor, one or more points of entry for catalyst, co-catalyst, monomer, prepolymer or first block of polymer, one or more points for unloading the solid, said polymerization reactor comprising an unloading device according to claim 1.

16. The polymerization reactor according to claim 15, wherein the unloading device is connected to the fluidizing-gas distributor.

17. The polymerization reactor according to claim 15, wherein the fluidizing-gas distributor comprises a conical or frustoconical fluidizing grid and in that the unloading device is connected to the lowermost point of the fluidizing grid.

18. The polymerization reactor according to claim 15, wherein the unloading device is connected to a point for unloading the solid that is situated above the fluidizing grid, in a side wall of the vessel of the polymerization reactor.

19. The device of claim 1, said device comprising means for minimizing drops in pressure in the pressurized vessel during unloading.

20. The method of claim 8, wherein drops in pressure in the pressurized vessel are minimized during unloading.

* * * * *